J. J. ALEXANDER.
SHOCK ABSORBER.
APPLICATION FILED JUNE 26, 1915.
1,188,232.
Patented June 20, 1916.
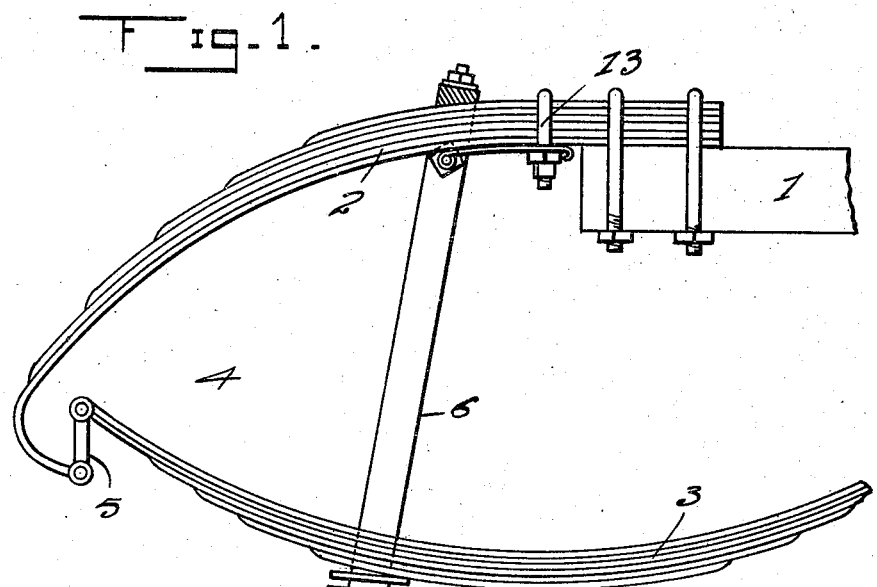
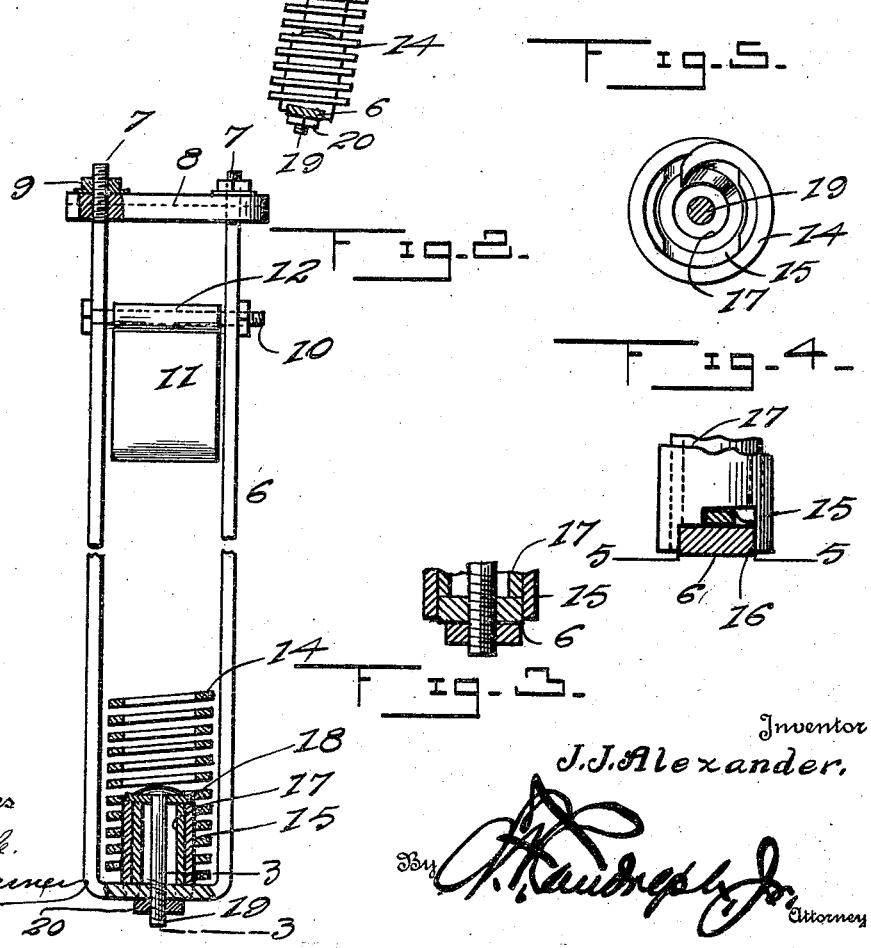
Inventor
J. J. Alexander,
Witnesses

UNITED STATES PATENT OFFICE.

JAMES J. ALEXANDER, OF VALLEY MILLS, TEXAS.

SHOCK-ABSORBER.

1,188,232.  Specification of Letters Patent.  Patented June 20, 1916.

Application filed June 26, 1915. Serial No. 36,452.

*To all whom it may concern:*

Be it known that I, JAMES J. ALEXANDER, a citizen of the United States, residing at Valley Mills, in the county of Bosque and State of Texas, have invented certain new and useful Improvements in Shock-Absorbers; and I do hereby declare the following to be a full, clear, and exact description of the invention, such as will enable others skilled in the art to which it appertains to make and use the same.

This invention is an improved shock absorber adapted to be attached to the springs of an automobile or other vehicle and to absorb and prevent shock incident to the rebound of the springs, the object of the invention being to provide improved shock absorbing mechanism of this character which may be readily attached to a spring and which is simple in construction and is not likely to get out of order.

The invention consists in the construction, combination and arrangement of devices hereinafter described and claimed.

In the accompanying drawings:—Figure 1 is an elevation of an automobile spring provided with a shock absorber constructed in accordance with my invention, the shock absorber being shown partly in section. Fig. 2 is a detail elevation, partly in section, of the shock absorber. Fig. 3 is a detail sectional view of the lower portion of the shock absorber on the plane indicated by the line 3—3 of Fig. 2. Fig. 4 is a detail elevation, partly in section of the bottom of the yoke and of the sleeve. Fig. 5 is an inverted plan partly in section, on the plane indicated by the line 5—5 of Fig. 4.

For the purposes of this specification I show a portion of an automobile chassis at 1, in Fig. 1 and the upper and lower members 2—3 of the spring 4 in said figure, connected together by the usual link 5.

In accordance with my invention I provide a U-shaped yoke 6 of suitable length through which the members 2—3 of the spring extend, the arms of the yoke having threaded extensions 7 at their upper ends which pass through openings in a bar 8 that bears on the upper side of the upper spring member 2 and is secured in place by nuts 9. A bolt 10 extends transversely of the yoke and through openings in its arms at a point immediately below the upper spring member 2, a clip plate 11 being pivotally mounted on said bolt as at 12 and being secured to the under side of the spring member 2 by suitable means, such for instance, as a clip bolt 13.

A coiled shock absorbing spring 14 is arranged in the lower end of the yoke and bears against the under side of the lower spring member 3. The lower portion of the spring 14 is arranged around a sleeve 15 which is arranged to bear on the lower connecting portion of the yoke and is provided at its lower end with a recess 16 for the reception of such portion of the yoke as shown in detail in Fig. 4. An inner sleeve 17 is arranged in the sleeve 15. A cap 18 is arranged on the upper ends of said sleeves and a bolt 19 passes through a central opening in said cap, is arranged in the center of the inner sleeve, passes through a central opening in the lower end of the yoke and is provided with a clamping nut 20, said bolt, nut, cap and inner and outer sleeves serving to secure the lower portion of the spring 14 in the lower portion of the yoke as will be understood.

The spring 14 exerts its tension on the lower side of the lower spring member 3 and serves to neutralize the rebound of the spring 4 and to absorb shocks, as will be understood.

Having thus described my invention, I claim:—

1. In combination with the upper and lower parts of a vehicle spring, a shock absorber comprising a yoke through which said spring parts extend, said yoke being secured to the upper spring part and extending below the lower spring part and a coiled spring arranged in and carried by the lower portion of the yoke and bearing against the under side of the lower spring part, an outer sleeve in the lower portion of said coiled spring and having a recess engaging the lower portion of the yoke, an inner sleeve in said outer sleeve, a cap on the upper ends of said sleeves, a bolt extending through said cap, said inner sleeve, and also through the lower portion of the yoke, and a clamping nut on said bolt and bearing against the lower end of the yoke.

2. In combination with the upper and lower parts of a vehicle spring, a shock absorber comprising a member engaging the upper side of the upper part of said spring, a coiled spring carried by said member and engaging the underside of the lower part of said spring, and means for securing said member in position upon the spring, said member being inclined downwardly and outwardly in the direction of the outer end of the vehicle spring.

3. In combination with the upper and lower parts of a vehicle spring, a shock absorber comprising a member engaging the upper side of the upper part of said vehicle spring, a coiled spring carried by said member and engaging the underside of the lower part of said vehicle spring, a plate carried by said member and engaging the underside of the upper part of said spring, and a clip engaging said plate and the upper part of said vehicle spring.

4. In combination with the upper and lower parts of a vehicle spring, a shock absorber comprising a member engaging the upper side of the upper part of said vehicle spring, a coiled spring carried by the member and engaging the underside of the lower part of said vehicle spring, a plate pivoted to said member and engaging the underside of the upper part of said spring, and a clip engaging said plate and the upper part of said vehicle spring.

5. In combination with the upper and lower parts of a vehicle spring, a shock absorber comprising a yoke through which said spring parts extend, a bar carried by said yoke and engaging the upper side of the upper part of said vehicle spring, a plate carried by said yoke and engaging the underside of the upper part of said vehicle spring, a clip engaging said plate and said upper part of the vehicle spring, and a coiled spring carried by the yoke and engaging the underside of the lower part of said vehicle spring.

6. A shock absorber for vehicle springs comprising a yoke, a sleeve secured to the bight of the yoke and provided at its lower end with a recess, and a coiled spring surrounding the sleeve and having its lower end located in the recess of the sleeve.

7. A shock absorber for vehicle springs comprising a member, means for attaching the upper end of the member to the upper part of a vehicle spring, a sleeve having a recess to receive the lower end of said member, said sleeve being provided with another recess at a point above the first named recess, means securing the sleeve to the member, and a coiled spring surrounding said sleeve and engaging the underside of the lower part of said vehicle spring, the lower end of the spring being located in the second recess of the sleeve.

In testimony whereof I affix my signature in presence of two witnesses.

JAMES J. ALEXANDER.

Witnesses:
W. V. BURCH,
WARREN GRANGER.

Copies of this patent may be obtained for five cents each, by addressing the "Commissioner of Patents, Washington, D. C."